United States Patent
Lin et al.

(10) Patent No.: US 12,430,712 B2
(45) Date of Patent: Sep. 30, 2025

(54) SUPER RESOLUTION IMAGE GENERATION CIRCUIT

(71) Applicant: Realtek Semiconductor Corp., HsinChu (TW)

(72) Inventors: Shang-Yen Lin, HsinChu (TW); Yi-Ting Bao, HsinChu (TW); Hao-Ran Wang, Zhangsha (CN); Chia-Wei Yu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 403 days.

(21) Appl. No.: 18/137,412

(22) Filed: Apr. 20, 2023

(65) Prior Publication Data
US 2024/0144426 A1 May 2, 2024

(30) Foreign Application Priority Data
Oct. 28, 2022 (CN) .......................... 202211340518.0

(51) Int. Cl.
*G06T 3/4053* (2024.01)
*G06T 7/50* (2017.01)
*G06V 10/771* (2022.01)

(52) U.S. Cl.
CPC .............. *G06T 3/4053* (2013.01); *G06T 7/50* (2017.01); *G06V 10/771* (2022.01)

(58) Field of Classification Search
CPC ....... G06T 3/4053; G06T 7/50; G06T 3/4046; G06V 10/771; G06V 10/82; G06N 3/04; G06N 3/08
See application file for complete search history.

(56) References Cited

U.S. PATENT DOCUMENTS

| 2021/0303243 A1* | 9/2021 | Li .......................... G06F 3/1208 |
| 2022/0189050 A1* | 6/2022 | Lin .......................... G06T 7/564 |

FOREIGN PATENT DOCUMENTS

| CN | 107240066 A | | 10/2017 | |
| CN | 108182669 A | | 6/2018 | |
| CN | 110807762 A | * | 2/2020 | ............. G06N 3/084 |
| TW | 202322608 A | | 6/2023 | |
| WO | WO-2024058804 A1 | * | 3/2024 | ............... G06T 5/73 |

OTHER PUBLICATIONS

Bao et al., the specification, including the claims, and drawings in the U.S. Appl. No. 18/381,649, filed Oct. 19, 2023.

* cited by examiner

*Primary Examiner* — Amandeep Saini
*Assistant Examiner* — Andrew S Budisalich
(74) *Attorney, Agent, or Firm* — Winston Hsu (57) ABSTRACT

A super resolution (SR) image generation circuit includes an image scale-up circuit, a stable SR processing circuit, a generative adversarial network (GAN) processing circuit, and a configurable basic block pool circuit. The image scale-up circuit is arranged to receive and process an input image to generate a scaled-up image. The stable SR processing circuit is arranged to receive a feature map of the input image to generate a stable delta value. The GAN processing circuit is arranged to receive the feature map to generate a GAN delta value. The configurable basic block pool circuit is arranged to dynamically configure a plurality of basic blocks according to a depth requirement of the input image, to generate a configuration result. The SR image generation circuit generates an SR image according to the scaled-up image, the stable delta value, and the GAN delta value.

11 Claims, 9 Drawing Sheets

SUPER RESOLUTION IMAGE GENERATION CIRCUIT

BACKGROUND OF THE INVENTION

1. Field of the Invention

The present invention is related to super resolution (SR) image processing, and more particularly, to an SR image generation circuit that can support different depth structures and/or different numbers of channels.

2. Description of the Prior Art

For SR image processing, a conventional SR image generation circuit implemented by hardware may include an image scale-up circuit, a stable SR processing circuit, and a generative adversarial network (GAN) processing circuit, wherein an input image such as a low resolution image is input to the image scale-up circuit to generate a scaled-up image which may be blurry, a feature map of the input image is input to the stable SR processing circuit to generate a stable delta value that can increase resolution, and the feature map of the input image is input to the GAN processing circuit to generate a GAN delta value with details not present in the low-resolution image. Afterwards, the stable delta value and the GAN delta value can be added to the scaled-up image to generate an SR image.

Both the stable SR processing circuit and the GAN processing circuit may have a plurality of first basic blocks and multiple sets of second basic blocks, wherein the first basic blocks are arranged to process depth requirements, and the multiple sets of second basic blocks are arranged to process color encoding format channel requirements. The conventional SR image generation circuit must determine a depth of the first basic blocks and a number of sets of the second basic blocks at an early stage in the hardware design, which causes inconvenience and limits design flexibility. As a result, a novel SR image generation circuit that can support different depth structures and/or different numbers of channels is urgently needed.

SUMMARY OF THE INVENTION

It is therefore one of the objectives of the present invention to provide an SR image generation circuit that can support different depth structures and/or different numbers of channels, to address the above-mentioned issues.

According to an embodiment of the present invention, an SR image generation circuit is provided. The SR image generation circuit comprises an image scale-up circuit, a stable SR processing circuit, a GAN processing circuit, and a configurable basic block pool circuit. The image scale-up circuit is arranged to receive and process an input image to generate a scaled-up image. The stable SR processing circuit is arranged to receive a feature map of the input image to generate a stable delta value. The GAN processing circuit is arranged to receive the feature map to generate a GAN delta value. The configurable basic block pool circuit is coupled to the stable SR processing circuit and the GAN processing circuit, and is arranged to dynamically configure a plurality of basic blocks according to a depth requirement of the input image, to generate a configuration result, wherein the stable delta value and the GAN delta value are generated according to the configuration result, and the SR image generation circuit generates an SR image according to the scaled-up image, the stable delta value, and the GAN delta value.

According to an embodiment of the present invention, an SR image generation circuit is provided. The SR image generation circuit comprises an image scale-up circuit, a stable SR processing circuit, a GAN processing circuit, and a configurable basic block pool circuit. The image scale-up circuit is arranged to receive and process an input image to generate a scaled-up image. The stable SR processing circuit is arranged to receive a feature map of the input image to generate a stable delta value. The GAN processing circuit is arranged to receive the feature map to generate a GAN delta value. The configurable basic block pool circuit is coupled to the stable SR processing circuit and the GAN processing circuit, and is arranged to dynamically configure multiple sets of basic blocks according to a number of at least one color encoding format channel that corresponds to at least one of the stable SR processing and the GAN processing circuit, to generate a configuration result, wherein the stable delta value and the GAN delta value are generated according to the configuration result, and the SR image generation circuit generates an SR image according to the scaled-up image, the stable delta value, and the GAN delta value.

One of the benefits of the present invention is that, via a configurable basic block pool circuit in the SR image generation circuit, a plurality of first basic blocks can be configured according to a depth requirement of an input image, and/or via another configurable basic block pool circuit in the SR image generation of the present invention, multiple sets of second basic blocks can be configured according to a number of at least one color encoding format channel that corresponds to at least one of the stable SR processing circuit and the GAN processing circuit. In this way, the SR image generation circuit of the present invention can support different depth structures and/or different numbers of channels, which can increase convenience and flexibility of design.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
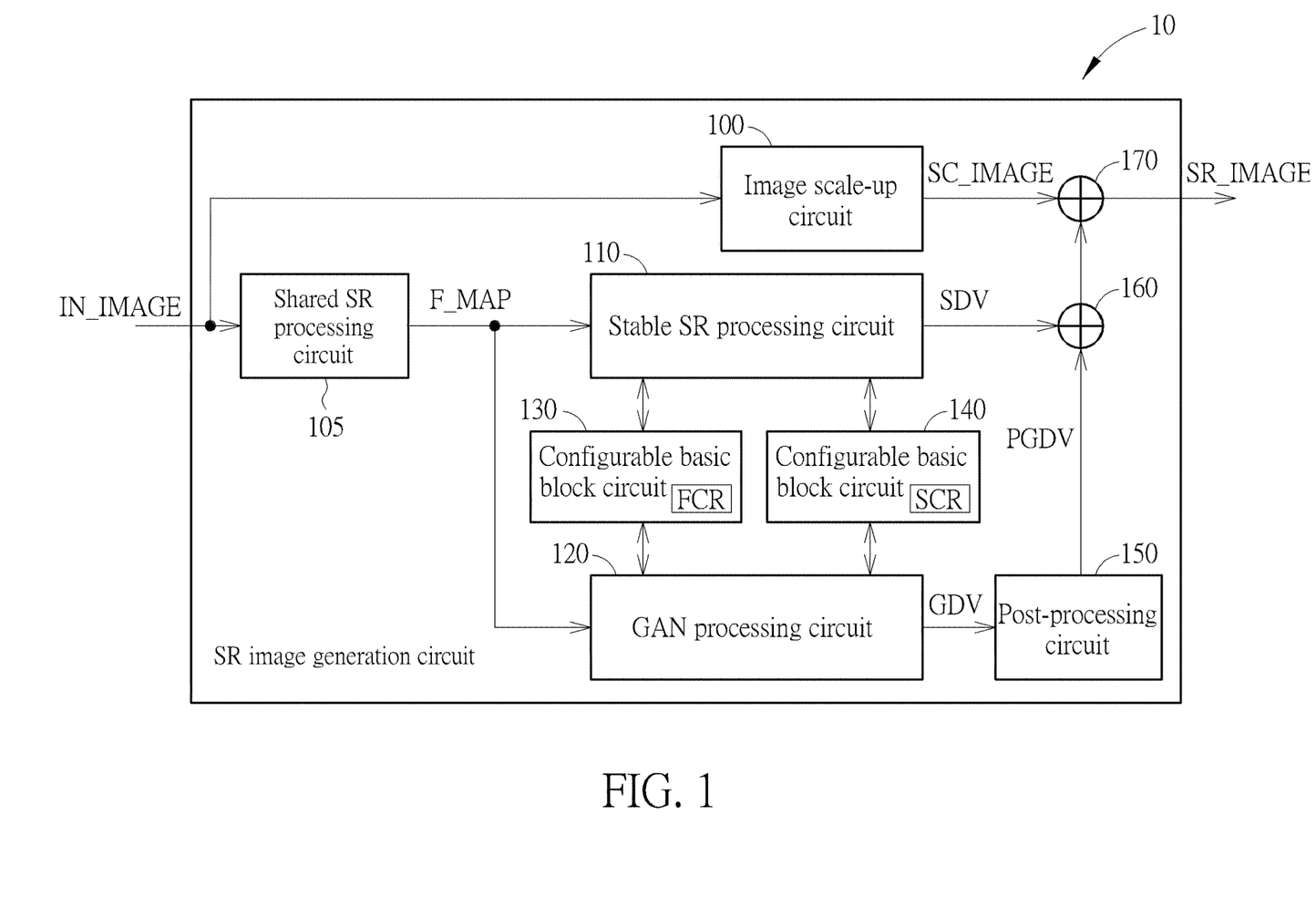
FIG. 1 is a diagram illustrating an SR image generation circuit according to an embodiment of the present invention.

FIG. 1 is a diagram illustrating a super resolution (SR) image generation circuit 10 according to an embodiment of the present invention. As shown in FIG. 1, the SR image generation circuit 10 may include an image scale-up circuit 100, a shared SR processing circuit 105, a stable SR processing circuit 110, a generative adversarial network (GAN) processing circuit 120, a plurality of configurable basic block pool circuits 130 and 140, a post-processing circuit 150, and a plurality of addition circuits 160 and 170. The image scale-up circuit 100 may be arranged to receive and scale up an input image IN_IMAGE such as a low resolution image) to generate a scaled-up image SC_IMAGE which may be blurry. The shared SR processing circuit 105 may be arranged to receive and process the input image IN_IMAGE to generate a feature map F_MAP of the input image IN_IMAGE, wherein the feature map F_MAP is input to the stable SR processing circuit 110 and the GAN processing circuit 120, respectively. The stable SR processing circuit 110 may be arranged to utilize artificial intelligence super resolution (AISR) technology to generate a stable delta value SDV for increasing resolution according to the feature map F_MAP, wherein the stable delta value SDV is stable (e.g. is less prone to have artifacts) but does not have details. The GAN processing circuit 120 may be arranged to utilize adversarial loss and perceptual loss of the GAN to generate a GAN delta value GDV with details not present in the input image IN_IMAGE according to the feature map F_MAP, wherein the GAN delta value GDV is unstable (e.g. is prone to have artifacts).

In this embodiment, both the stable SR processing circuit 110 and the GAN processing circuit 120 have a plurality of first basic blocks and multiple sets of second basic blocks, wherein the first basic blocks are arranged to process depth requirements, the multiple sets of second basic blocks are arranged to process requirements of color encoding format channels, and either of the first basic block and the second basic block may be a convolution block, a Residual Network (ResNet) block, a densely connected convolutional network (DenseNet), or other block based on convolutional neural network (CNN) architecture.

For the stable SR processing circuit 110 and the GAN processing circuit 120, in response to different feature maps F_MAP, the depth requirements of the first basic block may vary. It is assumed that a total number of first basic blocks in the stable SR processing circuit 110 and the GAN processing circuit 120 is fixed. If the input image IN_IMAGE is a natural image rich in texture, the GAN processing circuit 120 requires first basic blocks with larger depth (i.e. the GAN processing circuit 120 requires more first basic blocks). If the input image IN_IMAGE is an artificial image (e.g. a computer-generated (CG) image), the stable SR processing circuit 110 requires first basic blocks with larger depth (i.e. the stable SR processing circuit 110 requires more first basic blocks). In addition, in response to different usage situations, the requirements of the number of sets of the second basic blocks may vary. For example, for a color encoding format that requires three channels (e.g. a YUV color encoding format or an RGB color encoding format, wherein a value of Y represents brightness information (e.g. a grayscale value), a value of U represents chroma information, a value of V represents concentration information, and an RGB value represents color information of red, green, and blue), the stable SR processing circuit 110 and the GAN processing circuit 120 require three sets of second basic blocks, respectively (i.e. a total of six sets of second basic blocks are required). In another example, for a color encoding format that requires only one channel (e.g. a single Y color encoding format), the stable SR processing circuit 110 and the GAN processing circuit 120 require one set of second basic blocks, respectively (i.e. a total of two sets of second basic blocks are required).

As mentioned above, the conventional SR image generation circuit must determine a depth of the first basic blocks and a number of sets of the second basic blocks at an early stage of hardware design, which causes inconvenience and limits design flexibility. In order to solve this issue, the configurable basic block pool circuit 130 in the SR image generation circuit 10 of the present invention may be coupled to the stable SR processing circuit 110 and the GAN processing circuit 120, and may be arranged to dynamically configure the first basic blocks according to a depth requirement of the input image IN_IMAGE, to generate a first configuration result FCR. In addition, the configurable basic block pool circuit 140 in the SR image generation circuit 10 of the present invention may be coupled to the stable SR processing circuit 110 and the GAN processing circuit 120, and may be arranged to dynamically configure the multiple sets of second basic blocks according to a number of at least one color encoding format channel that corresponds to at least one of the stable SR processing circuit 110 and the GAN processing circuit 120, to generate a second configuration result SCR. In this way, the stable SR processing circuit 110 and the GAN processing circuit 120 may generate the stable delta value SDV and the GAN delta value GDV according to the first configuration result FCR and the second configuration result SCR, respectively.

It should be noted that, in some embodiments, the SR image generation circuit 10 may only include one of the configuration basic block pool circuits 130 and 140. For example, the SR image generation circuit 10 may only include the configuration basic block pool circuit 130 arranged to dynamically configure the first basic blocks, and the number of the sets of second basic blocks is determined at the early stage of the hardware design of the SR image generation circuit 10. In another example, the SR image generation circuit 10 may only include the configurable basic block pool circuit 140 arranged to dynamically configure the multiple sets of the second basic blocks, and the depth of the first basic blocks is determined at the early stage of the hardware design of the SR image generation circuit 10.

The post-processing circuit 150 may be coupled to the GAN processing circuit 120, and may be arranged to remove the artifacts in the GAN delta value GDV generated by the GAN processing circuit 120, to generate a processed GAN delta value PGDV. The addition circuit 160 may be arranged to add the processed GAN delta value PGDV to the stable delta value SDV. The addition circuit 170 may be arranged to add an output of the addition circuit 160 to the scaled-up image SC_IMAGE to generate an SR image SR IMAGE.

Figure 2:
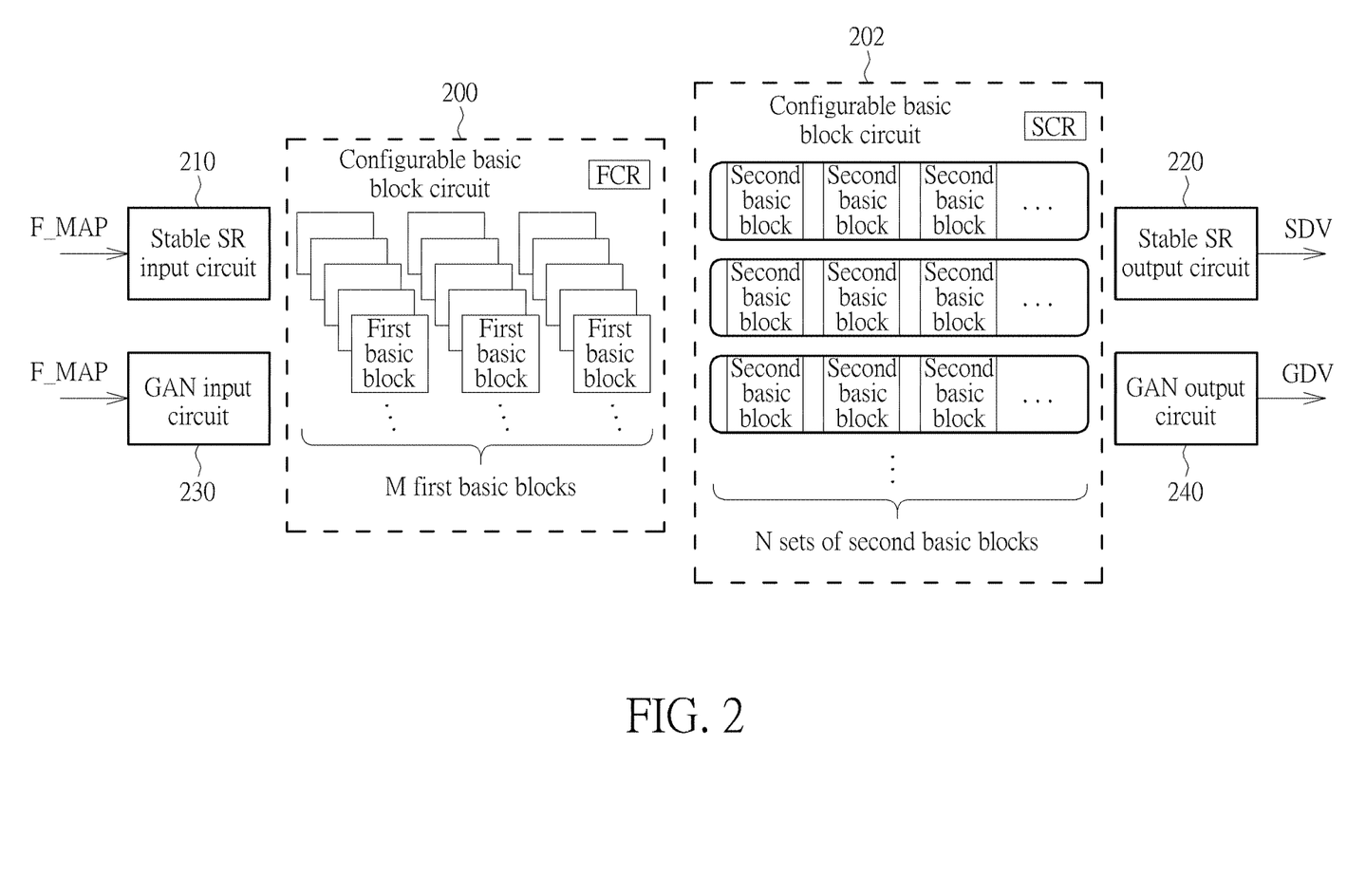
FIG. 2 is a diagram illustrating two configurable basic block pool circuits according to an embodiment of the present invention.

FIG. 2 is a diagram illustrating two configurable basic block pool circuits 200 and 202 according to an embodiment of the present invention, wherein the configurable basic block pool circuits 130 and 140 shown in FIG. 1 may be implemented by the configurable basic block pool circuits 200 and 202, respectively. As shown in FIG. 2, the configurable basic block pool circuit 200 may be arranged to dynamically configure M first basic blocks (M≥1) in the stable SR processing circuit 110 and the GAN processing circuit 120 according to the depth requirement of the input image IN_IMAGE, to generate the first configuration result FCR. The configurable basic block pool circuit 202 may be arranged to dynamically configure N sets of second basic blocks (N≥1) according to the number of the at least one color encoding format channel that corresponds to at least one of the stable SR processing circuit 110 and the GAN processing circuit 120, to generate the second configuration result SCR.

For better comprehension, the stable SR processing circuit 110 shown in FIG. 1 may include a stable SR input circuit 210 and a stable SR output circuit 220, wherein the stable SR input circuit 210 may be arranged to receive the feature map F_MAP, and the stable SR output circuit 220 may be arranged to generate the stable delta value SDV according to the first configuration result FCR generated by the configurable basic block pool circuit 200 and the second configuration result SCR generated by the configurable basic block pool circuit 202. In addition, the GAN processing circuit 120 shown in FIG. 1 may include a GAN input circuit 230 and a GAN output circuit 240, wherein the GAN input circuit 230 may be arranged to receive the feature map F_MAP, and the GAN output circuit 240 may be arranged to generate the GAN delta value GDV according to the first configuration result FCR generated by the configurable basic block pool circuit 200 and the second configuration result SCR generated by the configurable basic block pool circuit 202.

Figure 3:
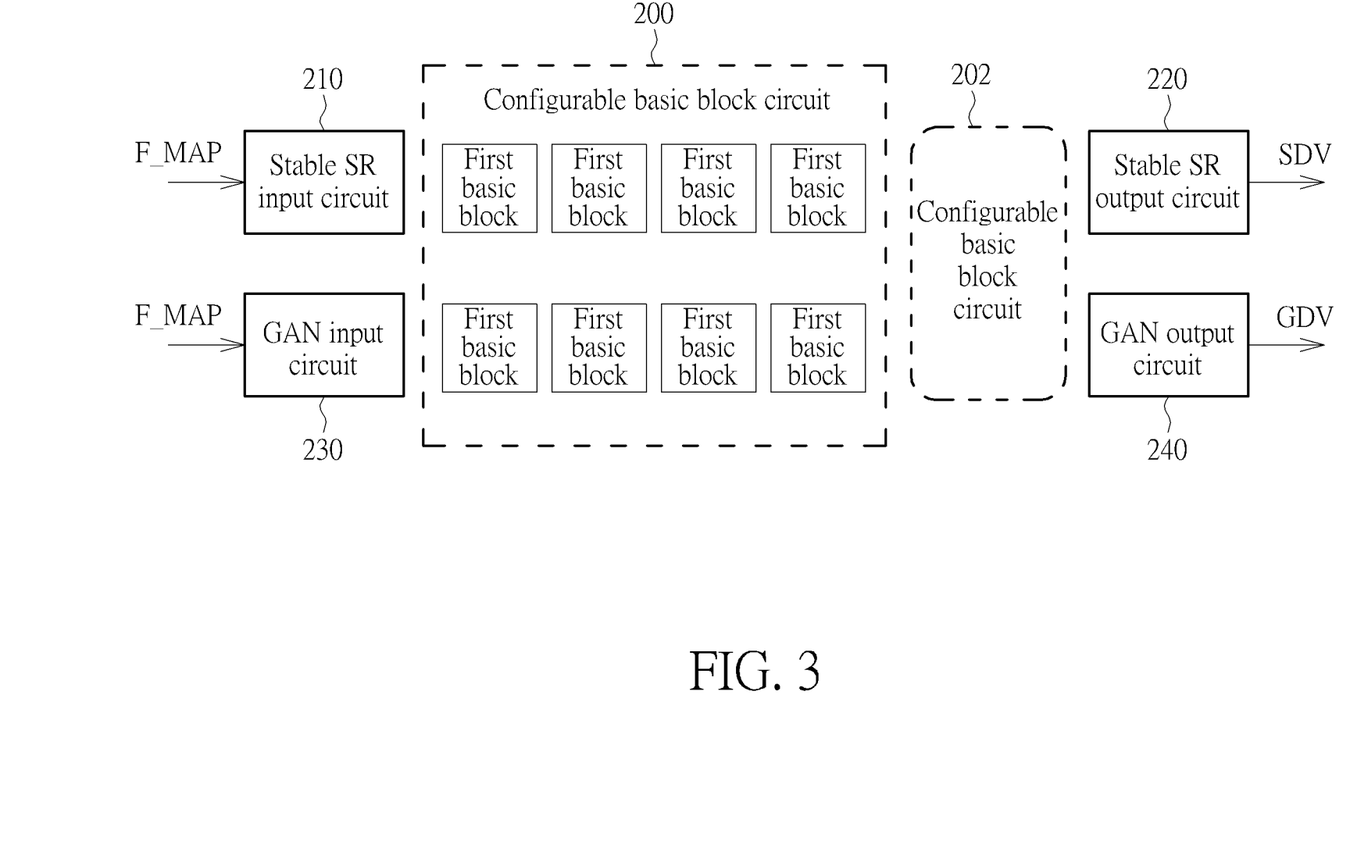
FIG. 3 is a diagram illustrating a plurality of first basic blocks configured by a configurable basic block pool circuit in the two configurable basic block pool circuits shown in FIG. 2 according to an embodiment of the present invention.

FIG. 3 is a diagram illustrating a plurality of first basic blocks configured by the configurable basic block pool circuit 200 shown in FIG. 2 according to an embodiment of the present invention. In this embodiment, assume that the number of first basic blocks in the stable SR processing circuit 110 (which includes the stable SR input circuit 210 and the stable SR output circuit 220) and the GAN processing circuit 120 (which includes the stable SR input circuit 210 and the stable SR output circuit 220) is 8 (i.e. M=8), and the depth requirement of the input image IN_IMAGE indicates that a depth corresponding to the stable SR processing circuit 110 is equal to a depth corresponding to the GAN processing circuit 120. Under this situation, the number of first basic blocks configured to the stable SR processing circuit 110 is equal to that configured to the GAN processing circuit 120 (e.g. the configurable basic block pool circuit 200 may configure 4 first basic blocks to the stable SR processing circuit 110 and configure another 4 first basic blocks to the GAN processing circuit 120).

Figure 4:
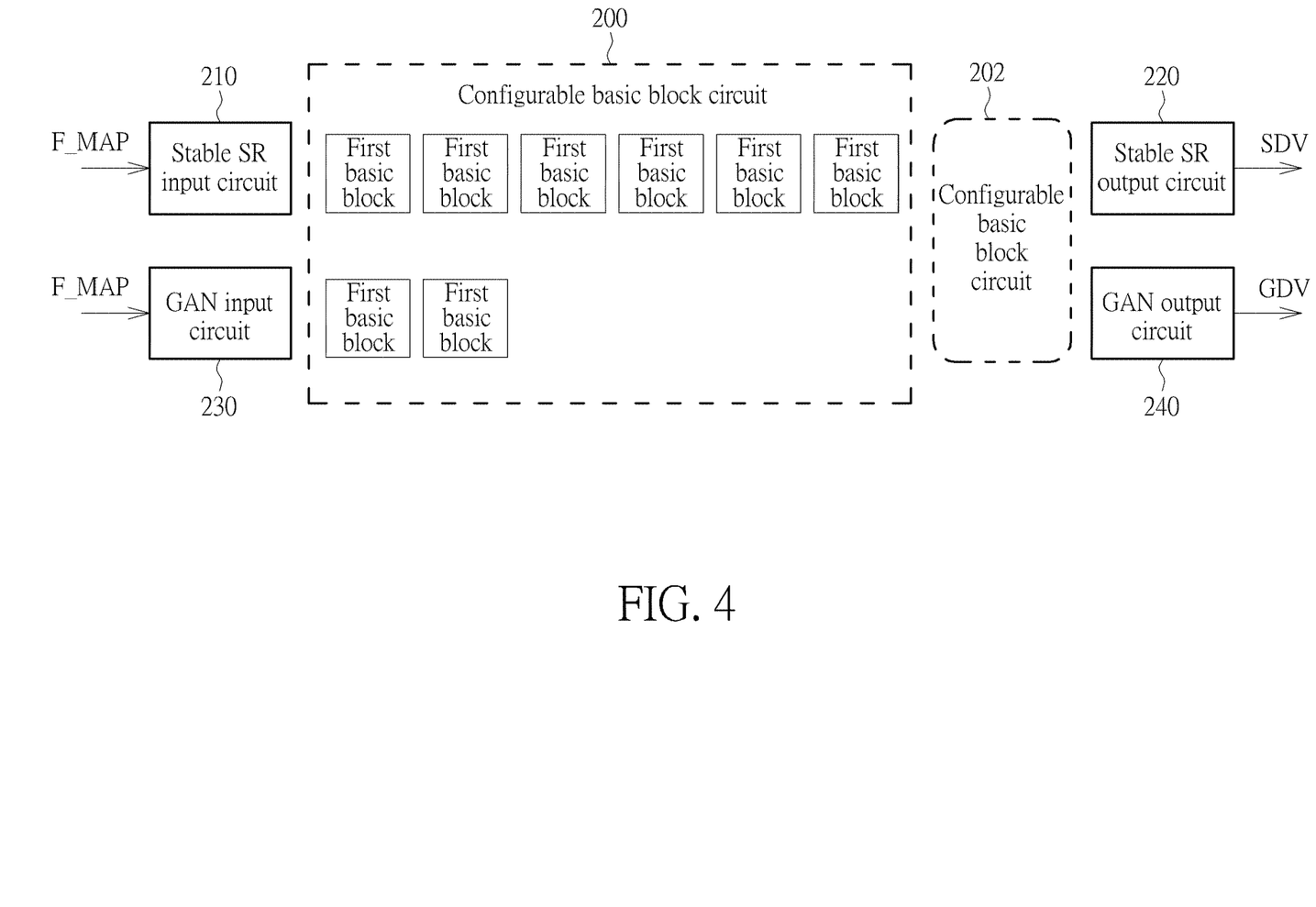
FIG. 4 is a diagram illustrating a plurality of first basic blocks configured by a configurable basic block pool circuit in the two configurable basic block pool circuits shown in FIG. 2 according to another embodiment of the present invention.

FIG. 4 is a diagram illustrating a plurality of first basic blocks configured by the configurable basic block pool circuit 200 shown in FIG. 2 according to another embodiment of the present invention. In this embodiment, assume that the number of first basic blocks in the stable SR processing circuit 110 (which includes the stable SR input circuit 210 and the stable SR output circuit 220) and the GAN processing circuit 120 (which includes the stable SR input circuit 210 and the stable SR output circuit 220) is 8 (i.e. M=8), and the depth requirement of the input image IN_IMAGE indicates that the depth corresponding to the stable SR processing circuit 110 is larger than that corresponding to the GAN processing circuit 120 (e.g. under a condition that the input image IN_IMAGE is an artificial image, the stable SR processing circuit 110 requires first basic blocks with larger depth). Under this situation, the number of first basic blocks configured to the stable SR processing circuit 110 is larger than that configured to the GAN processing circuit 120 (e.g. the configurable basic block pool circuit 200 may configure 6 first basic blocks to the stable SR processing circuit 110 and configure 2 first basic blocks to the GAN processing circuit 120).

In some embodiments, the depth requirement of the input image IN_IMAGE may indicate that the depth corresponding to the stable SR processing circuit 110 is less than that corresponding to the GAN processing circuit 120 (e.g. under a condition that the input image IN_IMAGE is a natural image rich in texture, the GAN processing circuit 120 requires first basic blocks with larger depth). Under this situation, the number of first basic blocks configured to the stable SR processing circuit 110 is less than that configured to the GAN processing circuit 120 (e.g. the configurable basic block pool circuit 200 may configure 2 first basic blocks to the stable SR processing circuit 110 and configure 6 first basic blocks to the GAN processing circuit 120). For brevity, similar descriptions for these embodiments are not repeated in detail here.

Figure 5:
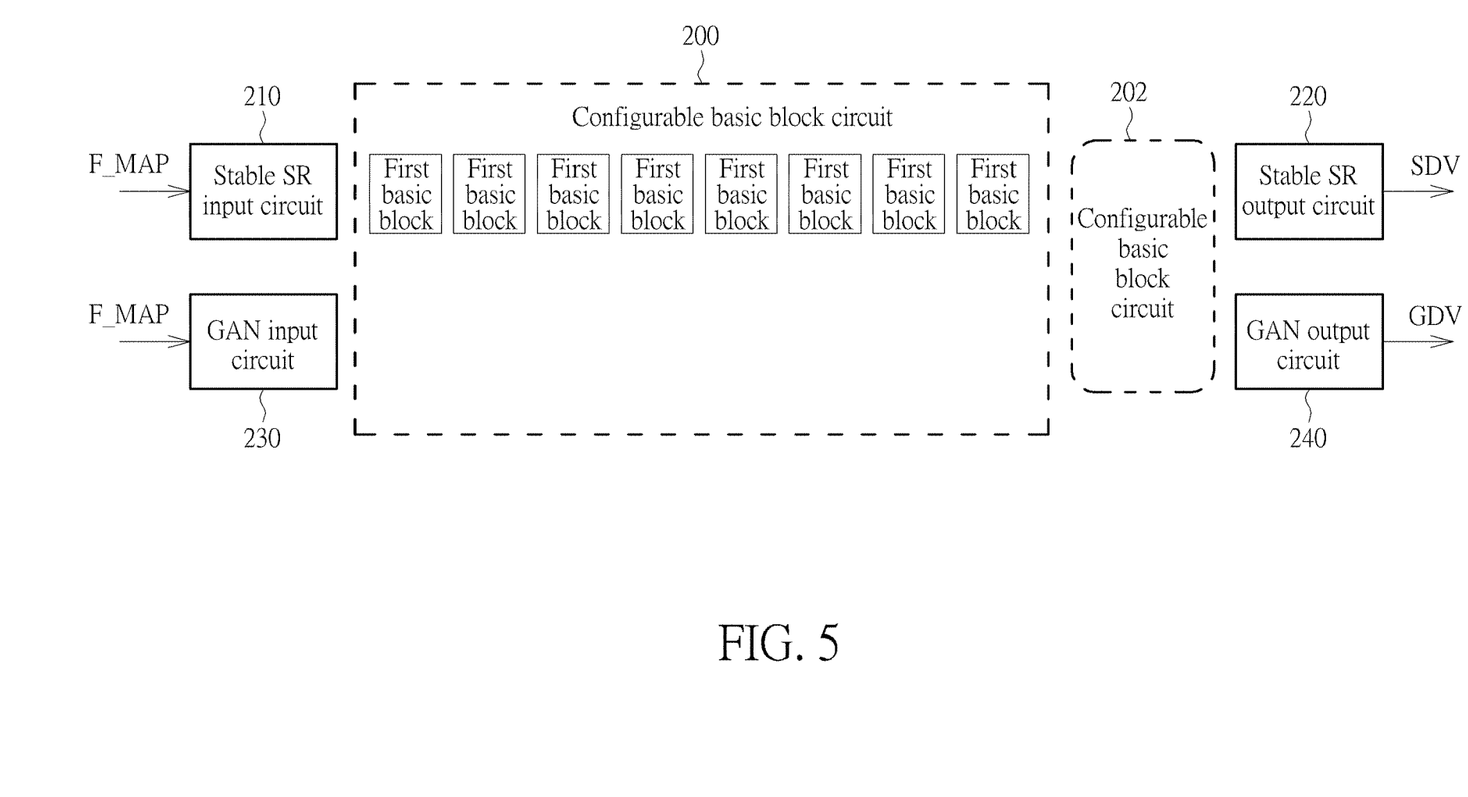
FIG. 5 is a diagram illustrating a plurality of first basic blocks configured by a configurable basic block pool circuit in the two configurable basic block pool circuits shown in FIG. 2 according to yet another embodiment of the present invention.

FIG. 5 is a diagram illustrating a plurality of first basic blocks configured by the configurable basic block pool circuit 200 shown in FIG. 2 according to yet another embodiment of the present invention. In this embodiment, assume that the number of first basic blocks in the stable SR processing circuit 110 (which includes the stable SR input circuit 210 and the stable SR output circuit 220) and the GAN processing circuit 120 (which includes the stable SR input circuit 210 and the stable SR output circuit 220) is 8 (i.e. M=8), and the depth requirement of the input image IN_IMAGE indicates the configurable basic block pool circuit 200 to configure all of the first basic blocks to the stable SR processing circuit 110. As shown in FIG. 5, the configurable basic block pool circuit 200 configures all of the 8 first basic blocks to the stable SR processing circuit 110. In some embodiments, the depth requirement of the input image IN_IMAGE may indicate the configurable basic block pool circuit 200 to configure all of the first basic blocks to the GAN processing circuit 120. For brevity, similar descriptions for these embodiments are not repeated in detail here.

Figure 6:
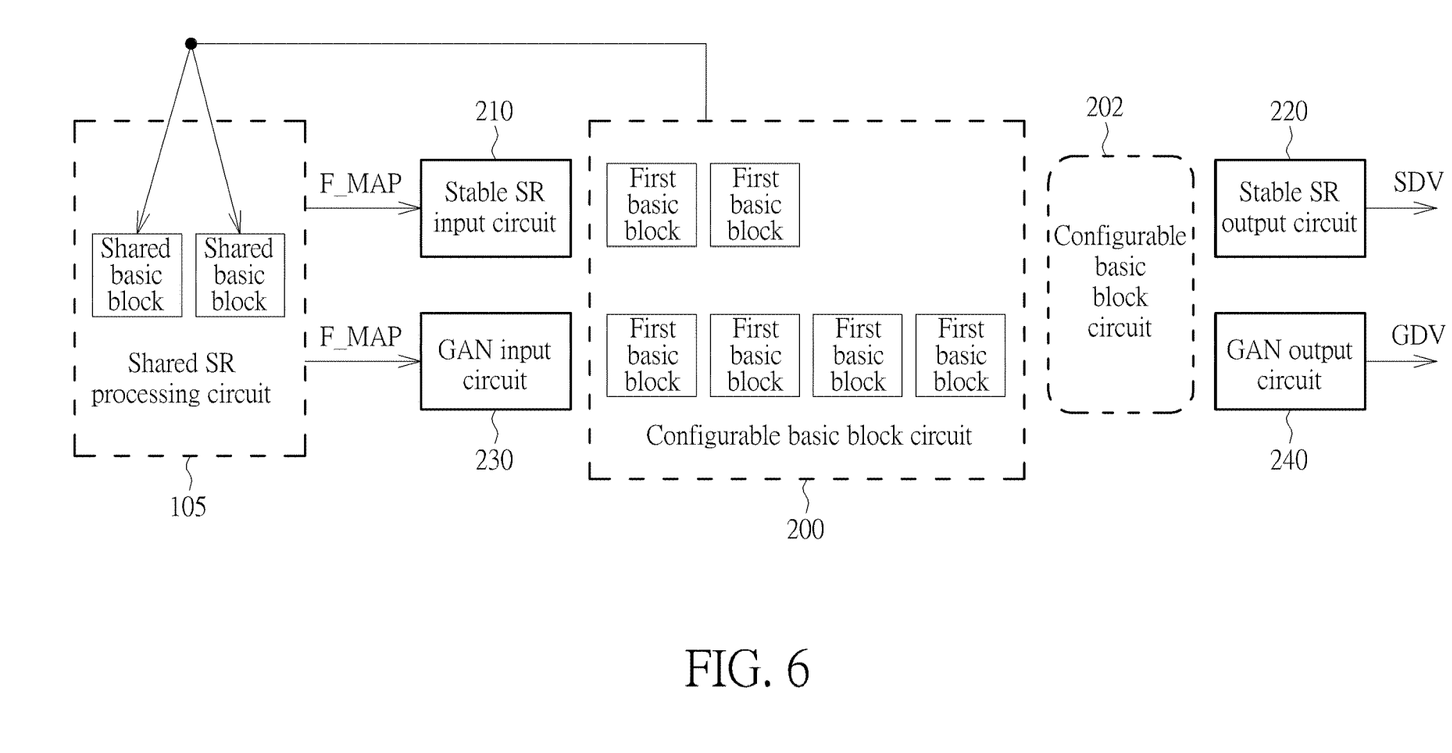
FIG. 6 is a diagram illustrating a plurality of first basic blocks configured by a configurable basic block pool circuit in the two configurable basic block pool circuits shown in FIG. 2 according to yet another embodiment of the present invention.

FIG. 6 is a diagram illustrating a plurality of first basic blocks configured by the configurable basic block pool circuit 200 shown in FIG. 2 according to yet another embodiment of the present invention. In this embodiment, assume that the number of first basic blocks in the stable SR processing circuit 110 (which includes the stable SR input circuit 210 and the stable SR output circuit 220) and the GAN processing circuit 120 (which includes the stable SR input circuit 210 and the stable SR output circuit 220) is 8 (i.e. M=8), and the depth requirement of the input image IN_IMAGE indicates the configurable basic block pool circuit 200 should configure 2 first basic blocks to the shared SR processing circuit 105 as shared basic blocks for the stable SR processing circuit 110 and the GAN processing circuit 120. In addition, assume that the depth requirement of the input image IN_IMAGE indicates that the depth corresponding to the stable SR processing circuit 110 is less than that corresponding to the GAN processing circuit 120. Under this situation, the number of first basic blocks configured to the stable SR processing circuit 110 is less than that configured to the GAN processing circuit 120 (e.g. the configurable basic block pool circuit 200 may configure 2 first basic blocks to the stable SR processing circuit 110 and configure 4 first basic blocks to the GAN processing circuit 120).

Figure 7:
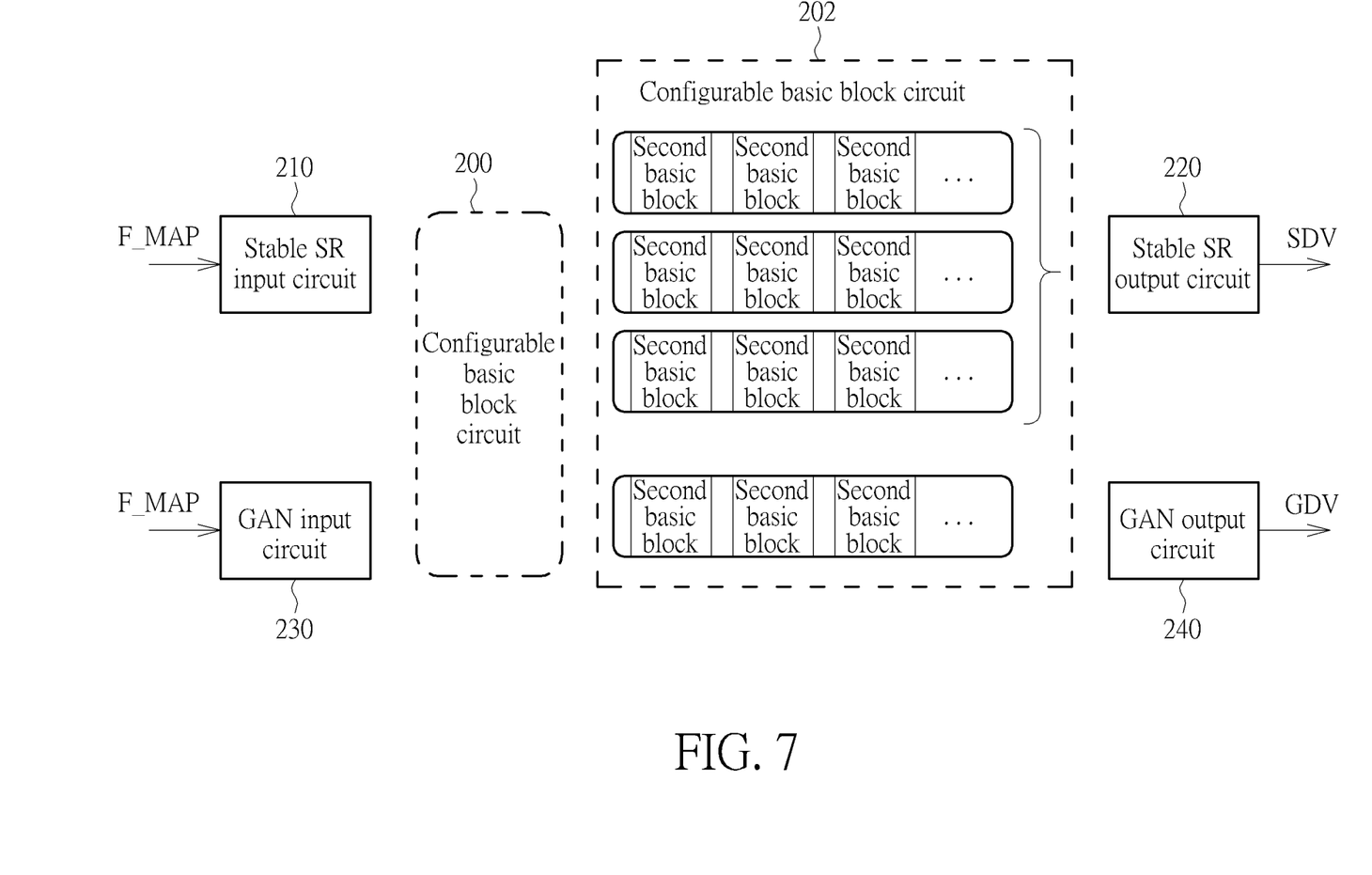
FIG. 7 is a diagram illustrating multiple sets of second basic blocks configured by another configurable basic block pool circuit in the two configurable basic block pool circuits shown in FIG. 2 according to an embodiment of the present invention.

FIG. 7 is a diagram illustrating multiple sets of second basic blocks configured by the configurable basic block pool circuit 202 shown in FIG. 2 according to an embodiment of the present invention. In this embodiment, assume that a number of sets of second basic blocks in the stable SR processing circuit 110 (which includes the stable SR input circuit 210 and the stable SR output circuit 220) and the GAN processing circuit 120 (which includes the stable SR input circuit 210 and the stable SR output circuit 220) is 4 (i.e. N=4), the stable SR processing circuit 110 corresponds to the YUV color encoding format (which requires 3 channels, i.e. Y encoding channel, U encoding channel, and V encoding channel), and the GAN processing circuit 120 corresponds to the single Y color encoding format (which requires only one channel, i.e. Y encoding channel). Under this situation, the configurable basic block pool circuit 202 may configure 3 sets of second basic blocks to the stable SR processing circuit 110 and configure one set of second basic blocks to the GAN processing circuit 120 (i.e. the number of sets of second basic blocks configured to the stable SR processing circuit 110 is larger than that configured to the GAN processing circuit 120).

In some embodiments, the stable SR processing circuit 110 may correspond to the single Y color encoding format (which requires only one channel, i.e. Y encoding channel), and the GAN processing circuit 120 may correspond to the YUV color encoding format (which requires 3 channels, i.e. Y encoding channel, U encoding channel, and V encoding channel). Under this situation, the configurable basic block pool circuit 202 may configure one set of second basic blocks to the stable SR processing circuit 110 and configure 3 sets of second basic blocks to the GAN processing circuit 120 (i.e. the number of sets of second basic blocks configured to the stable SR processing circuit 110 is less than that configured to the GAN processing circuit 120). For brevity, similar descriptions for these embodiments are not repeated in detail here.

As mentioned above, the conventional SR image generation circuit must determine the number of sets of second basic blocks at the early stage of hardware design. Under a condition that the stable SR processing circuit corresponds to the YUV color encoding format and the GAN processing circuit corresponds to the single Y color encoding format, the conventional SR image generation circuit must configure 3 sets of second basic blocks to the stable SR processing circuit and configure 3 sets of second basic blocks to the GAN processing circuit (i.e. a total of 6 sets of second basic blocks are required) to satisfy different usage cases (e.g. a case where the stable SR processing circuit corresponds to the single Y color encoding format and the GAN processing circuit corresponds to the YUV color encoding format). In contrast, the configurable basic block pool circuit 202 of the present invention may dynamically configure the multiple sets of second basic blocks according to the number of color encoding format channels corresponding to the stable SR processing circuit 110 and the GAN processing circuit 120. Under a condition that the stable SR processing circuit 110 corresponds to the YUV color encoding format and the GAN processing circuit 120 corresponds to the single Y color encoding format, the configurable basic block pool circuit 202 may configure 3 sets of second basic blocks and one set of second basic blocks to the stable SR processing circuit 110 and the GAN processing circuit 120, respectively (i.e. only a total of 4 sets of second basic blocks are required). Under a condition that the stable SR processing circuit 110 corresponds to the single Y color encoding format and the GAN processing circuit 120 corresponds to the YUV color encoding format, the configurable basic block pool circuit 202 may configure one set of second basic blocks and 3 sets of second basic blocks to the stable SR processing circuit 110 and the GAN processing circuit 120, respectively (i.e. only a total of 4 sets of second basic blocks are required).

Figure 8:
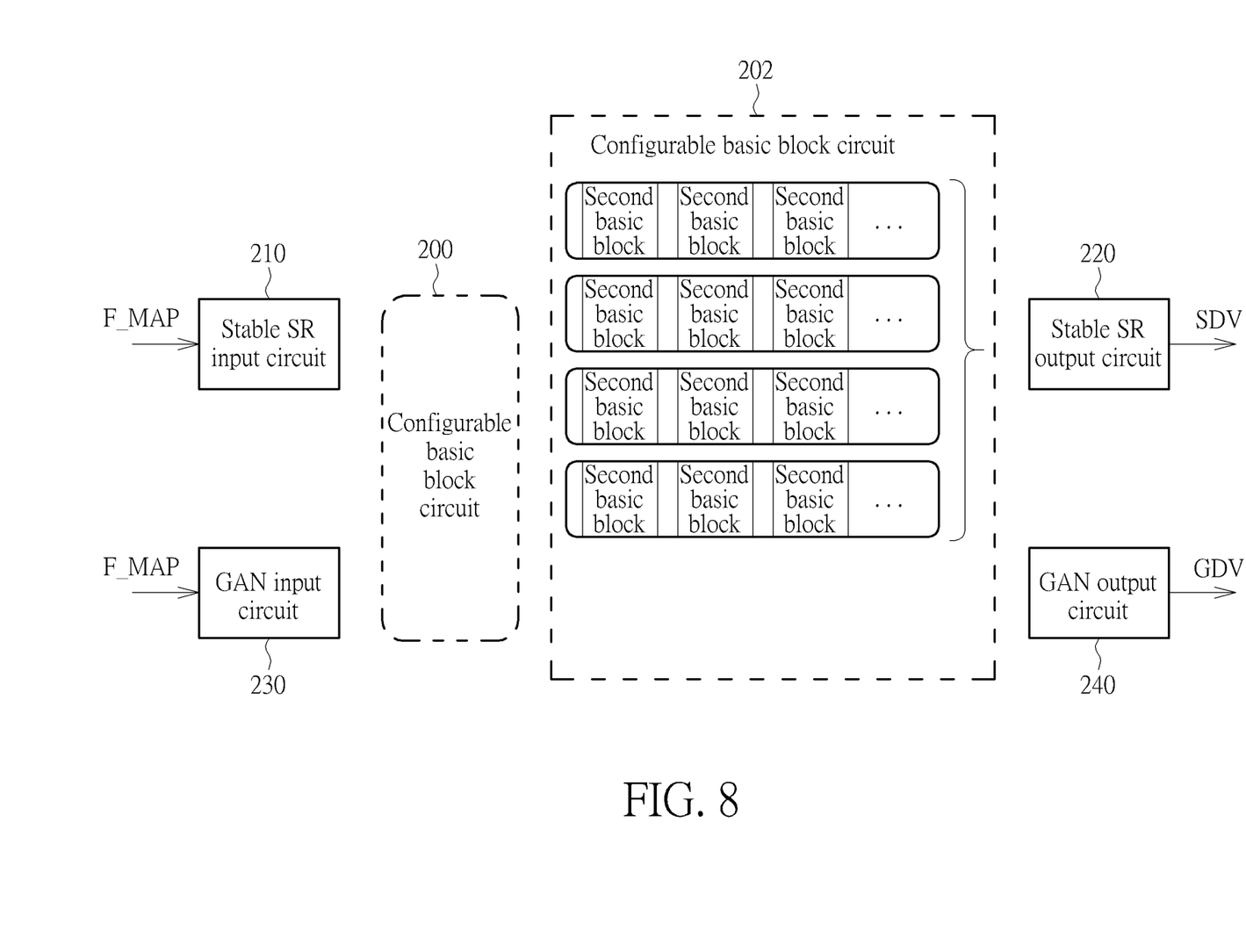
FIG. 8 is a diagram illustrating multiple sets of second basic blocks configured by another configurable basic block pool circuit in the two configurable basic block pool circuits shown in FIG. 2 according to another embodiment of the present invention.

FIG. 8 is a diagram illustrating multiple sets of second basic blocks configured by the configurable basic block pool circuit 202 shown in FIG. 2 according to another embodiment of the present invention. In this embodiment, assume that the number of sets of second basic blocks in the stable SR processing circuit 110 (which includes the stable SR input circuit 210 and the stable SR output circuit 220) and the GAN processing circuit 120 (which includes the stable SR input circuit 210 and the stable SR output circuit 220) is 4 (i.e. N=4), and only the stable SR processing circuit 110 corresponds to an ARGB color encoding format (which requires 4 channels, i.e. A encoding channel, R encoding channel, G encoding channel, and B encoding channel). Under this situation, the configurable basic block pool circuit 202 may configure all 4 sets of second basic blocks to the stable SR processing circuit 110. In some embodiments, only the stable SR processing circuit 110 corresponds to the single Y color encoding format (which requires only one channel, i.e. Y encoding channel), and it is required to achieve 4 times the throughput. Under this situation, the configurable basic block pool circuit 202 may configure all 4 sets of second basic blocks to the stable SR processing circuit 110.

In some embodiments, only the GAN processing circuit 120 corresponds to the ARGB color encoding format, and the configurable basic block pool circuit 202 may configure all 4 sets of second basic blocks to the GAN processing circuit 120. In some embodiments, only the GAN processing circuit 120 corresponds to the single Y color encoding format, and it is required to achieve 4 times the throughput. Under this situation, the configurable basic block pool circuit 202 may configure all 4 sets of second basic blocks to the GAN processing circuit 120. For brevity, similar descriptions for these embodiments are not repeated in detail here.

Figure 9:
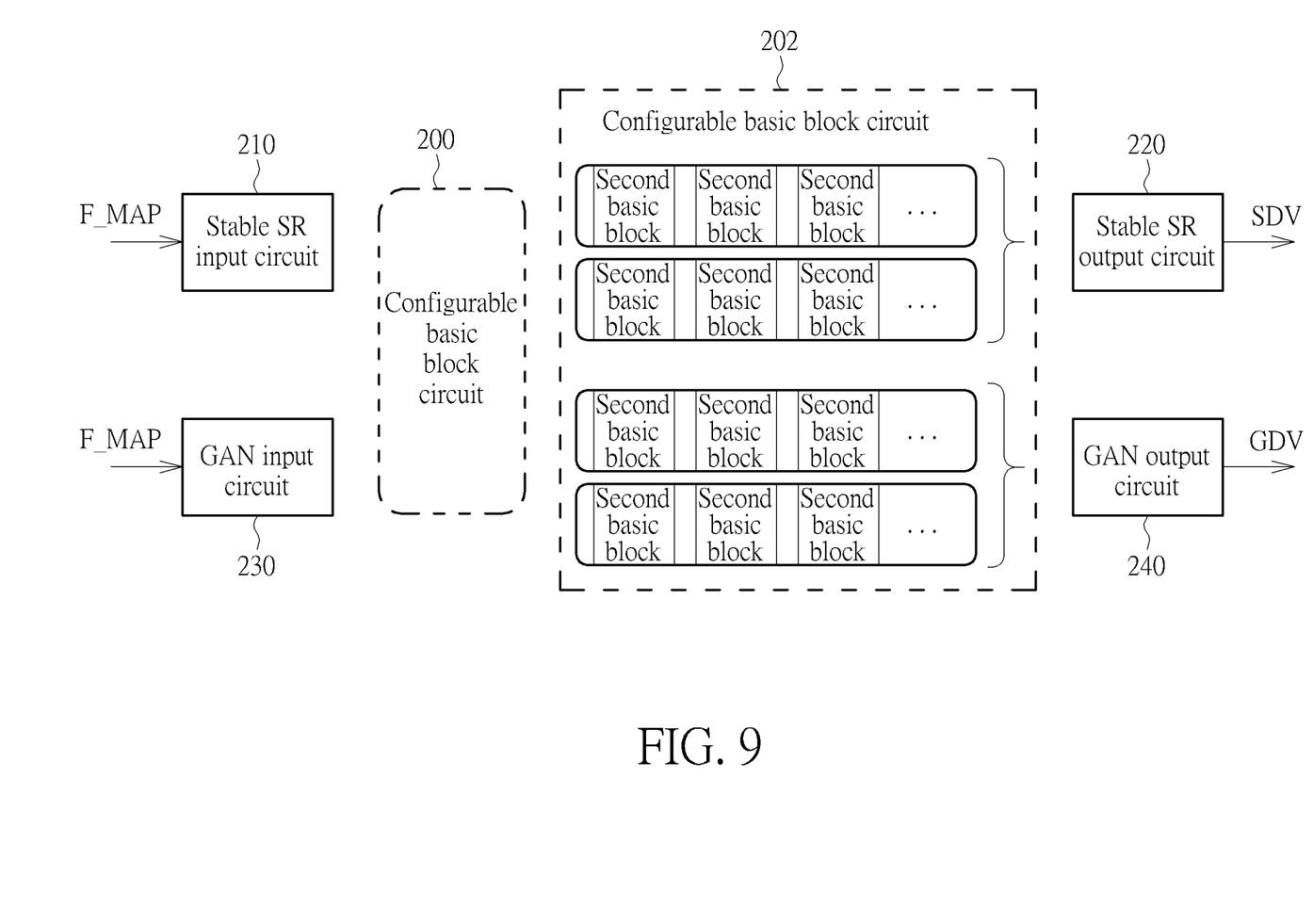
FIG. 9 is a diagram illustrating multiple sets of second basic blocks configured by another configurable basic block pool circuit in the two configurable basic block pool circuits shown in FIG. 2 according to yet another embodiment of the present invention.

FIG. 9 is a diagram illustrating multiple sets of second basic blocks configured by the configurable basic block pool circuit in 202 shown in FIG. 2 according to yet another embodiment of the present invention. In this embodiment, assume that the number of sets of second basic blocks in the stable SR processing circuit 110 (which includes the stable SR input circuit 210 and the stable SR output circuit 220) and the GAN processing circuit 120 (which includes the stable SR input circuit 210 and the stable SR output circuit 220) is 4 (i.e. N=4), both the stable SR processing circuit 110 and the GAN processing circuit 120 correspond to the single Y color encoding format (which requires only one channel, i.e. Y encoding channel), and both the stable SR processing circuit 110 and the GAN processing circuit 120 are required to achieve 2 times the throughput. Under this situation, the configurable basic block pool circuit 202 may configure 2 sets of second basic blocks and another 2 sets of second basic blocks to the stable SR processing circuit 110 and the GAN processing circuit 120, respectively (i.e. the number of sets of second basic blocks configured to the stable SR processing circuit 110 is equal to that configured to the GAN processing circuit 120).

In summary, via the configurable basic block pool circuit 130 in the SR image generation circuit 10, a plurality of first basic blocks can be configured according to a depth requirement of the input image IN_IMAGE, and/or via the configurable basic block pool circuit 140 in the SR image generation 10, multiple sets of second basic blocks can be configured according to a number of at least one of color encoding format channel that corresponds to at least one of the stable SR processing circuit 110 and the GAN processing circuit 120. In this way, the SR image generation circuit 10 of the present invention can support different depth structures and/or different numbers of channels, which can increase convenience and flexibility of design.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A super resolution (SR) image generation circuit, comprising:
    an image scale-up circuit, arranged to receive and process an input image to generate a scaled-up image;
    a stable SR processing circuit, arranged to receive a feature map of the input image to generate a stable delta value;
    a generative adversarial network (GAN) processing circuit, arranged to receive the feature map to generate a GAN delta value; and
    a configurable basic block pool circuit, coupled to the stable SR processing circuit and the GAN processing circuit, and arranged to dynamically configure a plurality of basic blocks according to a depth requirement of the input image, to generate a configuration result;
    wherein the stable delta value and the GAN delta value are generated according to the configuration result, and the SR image generation circuit generates an SR image according to the scaled-up image, the stable delta value, and the GAN delta value.

2. The SR image generation circuit of claim 1, wherein in response to a depth corresponding to the stable SR processing circuit being equal to a depth corresponding to the GAN processing circuit, a number of basic blocks configured to the stable SR processing circuit is equal to a number of basic blocks configured to the GAN processing circuit.

3. The SR image generation circuit of claim 1, wherein in response to a depth corresponding to the stable SR processing circuit being larger than a depth corresponding to the GAN processing circuit, a number of basic blocks configured to the stable SR processing circuit is larger than a number of basic blocks configured to the GAN processing circuit.

4. The SR image generation circuit of claim 1, wherein in response to a depth corresponding to the stable SR processing circuit being less than a depth corresponding to the GAN processing circuit, a number of basic blocks configured to the stable SR processing circuit is less than a number of basic blocks configured to the GAN processing circuit.

5. The SR image generation circuit of claim 1, wherein the configurable basic block pool circuit configures all of the plurality of basic blocks to the stable SR processing circuit or the GAN processing circuit.

6. The SR image generation circuit of claim 1, wherein the SR image generation circuit further comprises a shared SR processing circuit, the shared SR processing circuit is arranged to receive and process the input image to generate the feature map, and the configurable basic block pool circuit configures a part of the plurality of basic blocks to the shared SR processing circuit as a plurality of shared basic blocks for the stable SR processing circuit and the GAN processing circuit.

7. A super resolution (SR) image generation circuit, comprising:
    an image scale-up circuit, arranged to receive and process an input image to generate a scaled-up image;
    a stable SR processing circuit, arranged to receive a feature map of the input image to generate a stable delta value;
    a generative adversarial network (GAN) processing circuit, arranged to receive the feature map to generate a GAN delta value; and
    a configurable basic block pool circuit, coupled to the stable SR processing circuit and the GAN processing circuit, and arranged to dynamically configure multiple sets of basic blocks according to a number of at least one color encoding format channel that corresponds to at least one of the stable SR processing and the GAN processing circuit, to generate a configuration result;
    wherein the stable delta value and the GAN delta value are generated according to the configuration result, and the SR image generation circuit generates an SR image according to the scaled-up image, the stable delta value, and the GAN delta value.

8. The SR image generation circuit of claim 7, wherein in response to a number of at least one color encoding format channel that corresponds to the stable SR processing circuit being equal to a number of at least one color encoding format channel that corresponds to the GAN processing circuit, a number of sets of the multiple sets of basic blocks configured to the stable SR processing circuit is equal to a number of sets of the multiple sets of basic blocks configured to the GAN processing circuit.

9. The SR image generation circuit of claim 7, wherein in response to a number of at least one color encoding format channel that corresponds to the stable SR processing circuit being larger than a number of at least one color encoding format channel that corresponds to the GAN processing circuit, a number of sets of the multiple sets of basic blocks configured to the stable SR processing circuit is larger than a number of sets of the multiple sets of basic blocks configured to the GAN processing circuit.

10. The SR image generation circuit of claim 7, wherein in response to a number of at least one color encoding format channel that corresponds to the stable SR processing circuit being less than a number of at least one color encoding format channel that corresponds to the GAN processing circuit, a number of sets of the multiple sets of basic blocks configured to the stable SR processing circuit is less than a number of sets of the multiple sets of basic blocks configured to the GAN processing circuit.

11. The SR image generation circuit of claim 7, the configurable basic block pool circuit configures all of the multiple sets of the basic blocks to the stable SR processing circuit or the GAN processing circuit.

* * * * *